US012657289B2

(12) United States Patent
Yoshioka

(10) Patent No.: US 12,657,289 B2
(45) Date of Patent: Jun. 16, 2026

(54) MANAGEMENT APPARATUS, CONTROL METHOD OF MANAGEMENT APPARATUS, AND STORAGE MEDIUM

(71) Applicant: CANON KABUSHIKI KAISHA, Tokyo (JP)

(72) Inventor: Migaku Yoshioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 18/439,553

(22) Filed: Feb. 12, 2024

(65) Prior Publication Data

US 2024/0281521 A1 Aug. 22, 2024

(30) Foreign Application Priority Data

Feb. 16, 2023 (JP) ................................. 2023-022714

(51) Int. Cl.
*G06F 21/54* (2013.01)
*G06F 21/55* (2013.01)
*G06F 21/60* (2013.01)

(52) U.S. Cl.
CPC ............ *G06F 21/54* (2013.01); *G06F 21/552* (2013.01); *G06F 21/608* (2013.01)

(58) Field of Classification Search
CPC ....... G06F 21/54; G06F 21/552; G06F 21/608
See application file for complete search history.

(56) References Cited

U.S. PATENT DOCUMENTS 9,059,870 B1 * 6/2015 Sobel .................... H04L 51/066
2007/0277222 A1 * 11/2007 Pouliot ................. G06F 21/577
726/1

2015/0067767 A1 * 3/2015 Shimizu .................. H04L 63/20
726/1
2016/0112459 A1 * 4/2016 Tsuchitoi ............ H04L 63/0428
713/168
2023/0153044 A1 * 5/2023 Kulkarni ............... G06F 21/577
358/1.15
2024/0414005 A1 * 12/2024 Lande Blau .............. G06F 8/63

FOREIGN PATENT DOCUMENTS

JP 2007185814 A 7/2007
JP 2015018338 A 1/2015

* cited by examiner

*Primary Examiner* — Catherine Thiaw
*Assistant Examiner* — Daniel Elahian
(74) *Attorney, Agent, or Firm* — Canon U.S.A., Inc. IP Division

(57) ABSTRACT

A management apparatus managing an image processing apparatus includes at least one memory and at least one processor which function as a determining unit configured to determine a security policy, an input unit configured to input designation of the image processing apparatus of which the security policy is to be monitored, a delivery unit configured to deliver the security policy to the image processing apparatus to be monitored, an acquisition unit configured to acquire a type corresponding to an installation environment or how to use selected in the image processing apparatus, from the image processing apparatus to which the security policy is delivered, a holding unit configured to hold the acquired type, and an execution unit configured to execute a monitoring process of the security policy, for the image processing apparatus to be monitored.

5 Claims, 10 Drawing Sheets

Figure 2:
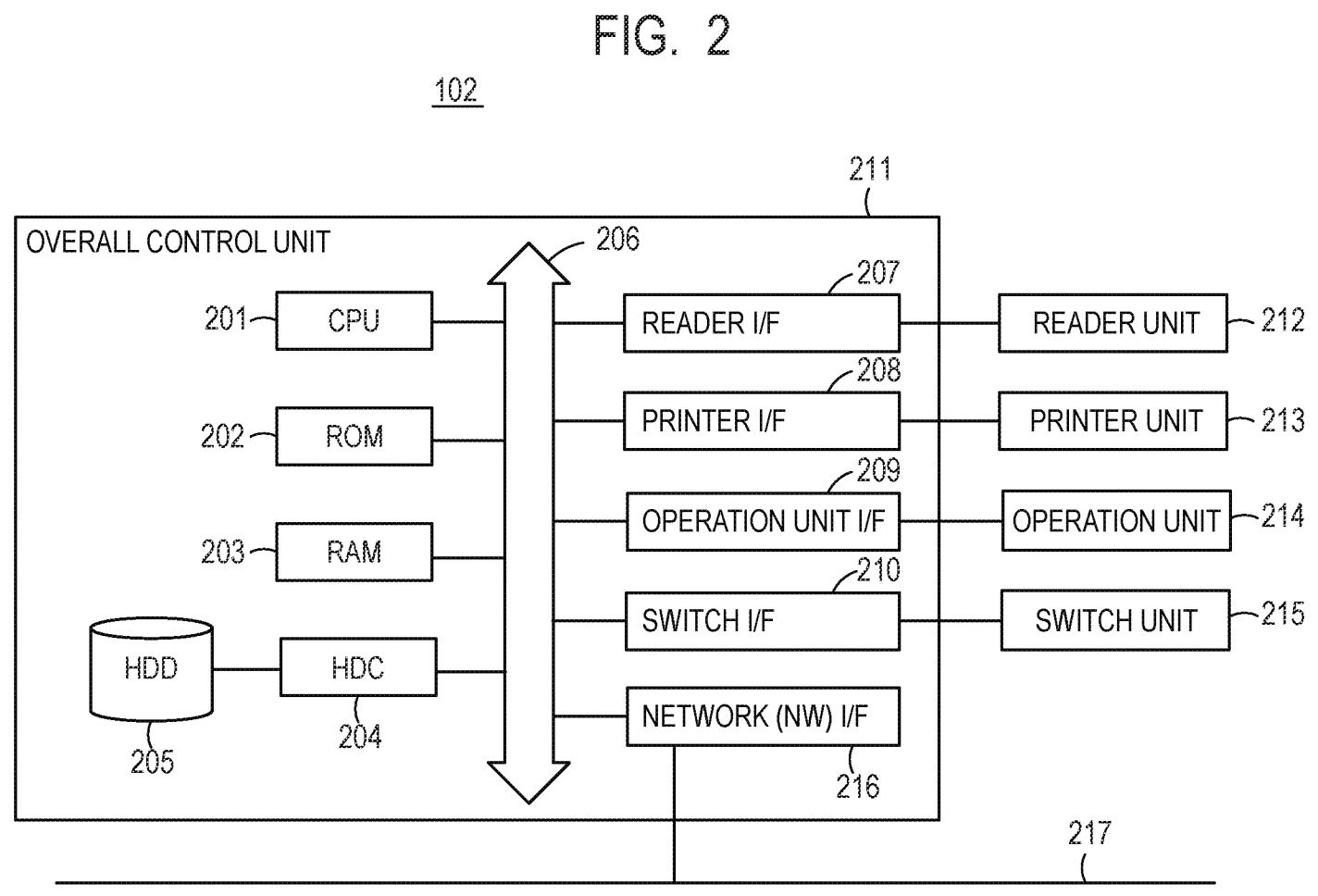

OVERALL CONTROL UNIT 211

CPU 201

ROM 202

RAM 203

HDC 204

HDD 205

206

READER I/F 207

PRINTER I/F 208

OPERATION UNIT I/F 209

SWITCH I/F 210

NETWORK (NW) I/F 216

READER UNIT 212

PRINTER UNIT 213

OPERATION UNIT 214

SWITCH UNIT 215

Figure 4:
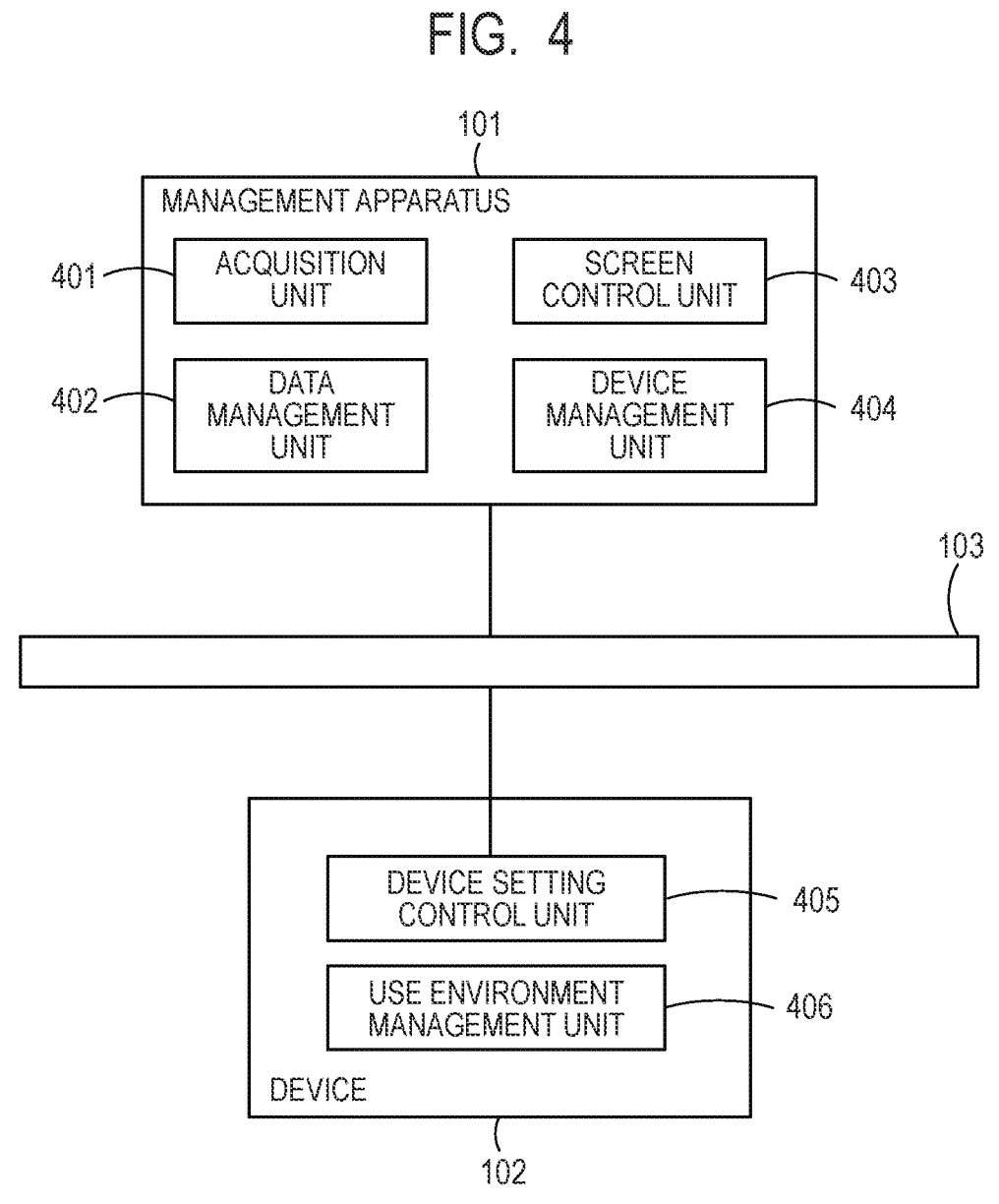

MANAGEMENT APPARATUS

401 — ACQUISITION UNIT

403 — SCREEN CONTROL UNIT

402 — DATA MANAGEMENT UNIT

404 — DEVICE MANAGEMENT UNIT

103

DEVICE SETTING CONTROL UNIT — 405

USE ENVIRONMENT MANAGEMENT UNIT — 406

DEVICE

| SECURITY POLICY NAME | DIRECT CONNECTION/WIRELESS LAN PROHIBITION |
|---|---|

| ☐ | INTERFACE |
|---|---|
|  | ·WIRELESS POLICY |
| ☑ | PROHIBIT USE OF DIRECT CONNECTION |
| ☑ | PROHIBIT USE OF WIRELESS LAN |
|  | ⋮ |
|  | ·USB POLICY |
| ☐ | PROHIBIT USE AS USB DEVICE |
| ☑ | PROHIBIT USE OF USB EXTERNAL STORAGE DEVICE |
|  | ⋮ |
| ☐ | AUTHENTICATION |
|  | ·PASSWORD SETTING POLICY |
| ☑ | SET MINIMUM NUMBER OF CHARACTERS IN PASSWORD |
| MINIMUM NUMBER OF CHARACTERS : | 8 |
|  | ⋮ |
|  | ⋮ |

| APPLY | DELETE | CANCEL |
|---|---|---|

FIG. 6

| TASK TYPE | SECURITY MONITORING & DELIVERY | | |
|---|---|---|---|
| VALID/INVALID | ● VALID | ○ INVALID | |
| EXECUTION SCHEDULE | EXECUTE IMMEDIATELY | | |
| PROCESS CONTENTS | ● DELIVER SECURITY SETTING AND OVERWRITE DEVICE SETTING | ○ DELIVER SECURITY SETTING AND OVERWRITE DEVICE SETTING ONLY WHEN DEVICE USE ENVIRONMENT IS NOT CHANGED | ○ DETECT CHANGE ONLY |
| PASSWORD | password | | |
| MAIL NOTIFICATION SETTING | ☑ EXECUTE NOTIFICATION WITH MAIL WHEN DETECTING CHANGE AT TIME OF MONITORING | | |
| ADDRESS | example@mail.com | | |
| SECURITY SETTING INFORMATION NAME | ● DIRECT CONNECTION/WIRELESS LAN PROHIBITION | ○ IN-HOUSE INTRANET | ⋮ |
| DEVICE SELECTION | ☑ DEVICE 1 | ☑ DEVICE 2 | ⋮ |

APPLY    CANCEL

SET/REGISTER

<RECOMMENDED SECURITY SETTING>

800

ENVIRONMENT TYPE

| |
|---|
| IN-HOUSE INTRANET TYPE |
| INTERNET DIRECT CONNECTION TYPE |
| INTERNET PROHIBITION TYPE |
| WORK FROM HOME TYPE |
| PUBLIC SPACE TYPE |
| HIGH CONFIDENTIAL INFORMATION MANAGEMENT TYPE |

801

CANCEL SETTING

802

EXECUTE

Figure 9:
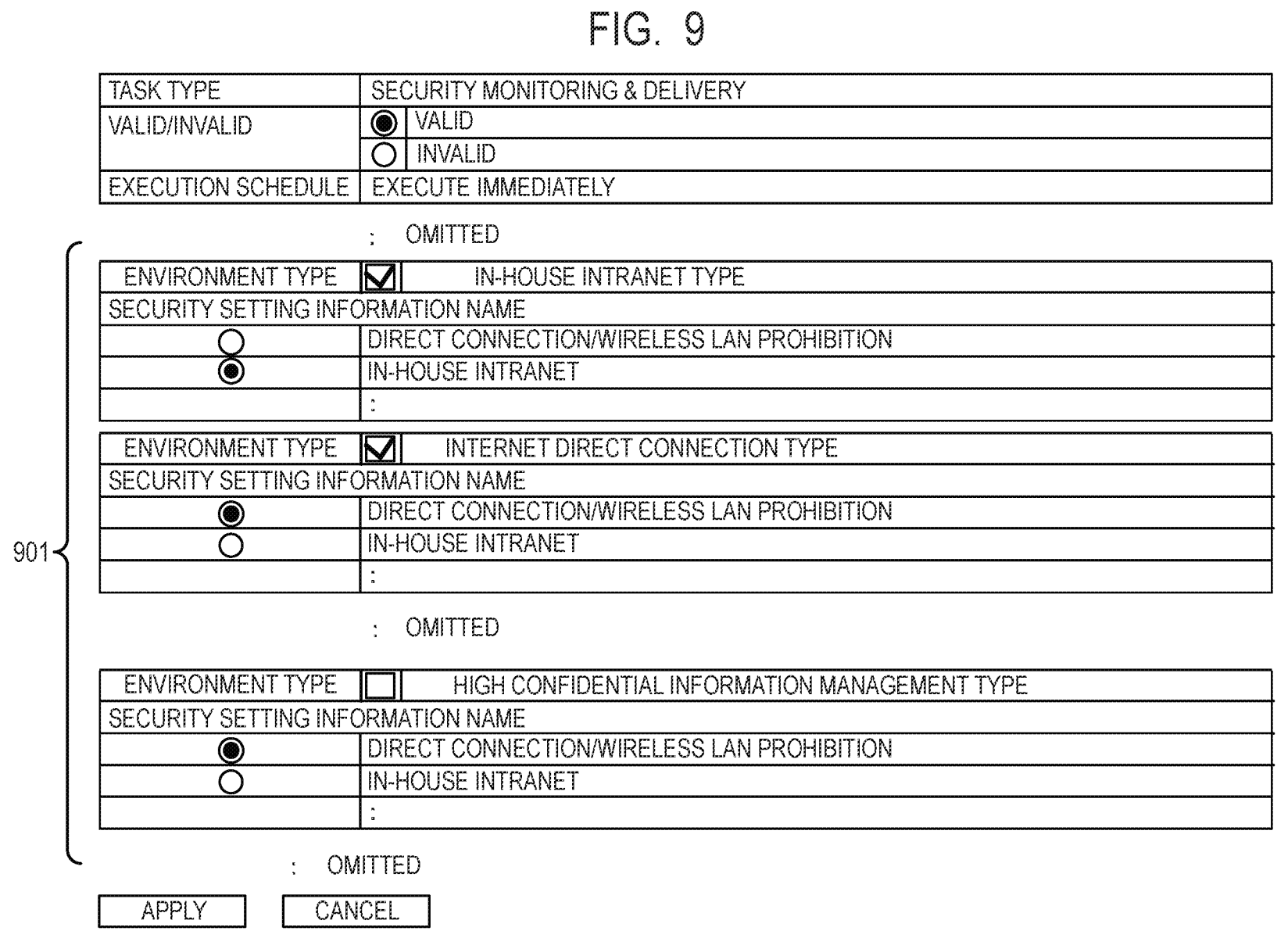

| TASK TYPE | SECURITY MONITORING & DELIVERY |
|---|---|
| VALID/INVALID | ◉ VALID  ○ INVALID |
| EXECUTION SCHEDULE | EXECUTE IMMEDIATELY |

: OMITTED

| ENVIRONMENT TYPE | ☑ IN-HOUSE INTRANET TYPE |
|---|---|
| SECURITY SETTING INFORMATION NAME | |
| ○ | DIRECT CONNECTION/WIRELESS LAN PROHIBITION |
| ◉ | IN-HOUSE INTRANET |
| | : |

| ENVIRONMENT TYPE | ☑ INTERNET DIRECT CONNECTION TYPE |
|---|---|
| SECURITY SETTING INFORMATION NAME | |
| ◉ | DIRECT CONNECTION/WIRELESS LAN PROHIBITION |
| ○ | IN-HOUSE INTRANET |
| | : |

: OMITTED

| ENVIRONMENT TYPE | ☐ HIGH CONFIDENTIAL INFORMATION MANAGEMENT TYPE |
|---|---|
| SECURITY SETTING INFORMATION NAME | |
| ◉ | DIRECT CONNECTION/WIRELESS LAN PROHIBITION |
| ○ | IN-HOUSE INTRANET |
| | : |

: OMITTED

901

APPLY          CANCEL

MANAGEMENT APPARATUS, CONTROL METHOD OF MANAGEMENT APPARATUS, AND STORAGE MEDIUM

BACKGROUND

Field

The present disclosure relates to a management apparatus managing an image processing apparatus, a control method of the management apparatus, and a storage medium storing a program for executing the control method.

Description of the Related Art

In general, a device (e.g., an image processing apparatus such as a printer, a multifunction peripheral or the like) connected to a network has a setting function for performing a setting of a security-related function based on a user operation. In recent years, the devices have been installed in various use environments such as work from home, a public space shared by a large number of unspecified people and the like, so that necessary security settings have become complicated.

Japanese Patent Application Laid-Open No. 2007-185814 proposes a technique in which a user designates a security level classified in stages to collectively set security-related functions of devices according to the security level.

On the other hand, there is a possibility that the setting of the security-related function is changed by the user to that unintended by an administrator of the device. In a case where the devices are managed on a large scale, even if an administrator of the device for each site changes the setting of the security-related function, such a change may be an unintended setting change for a device administrator who unitarily manages the devices at a plurality of sites. In order to prevent such an unintended change of the security setting, the device administrator can unitarily manage the security-related functions of the plurality of devices by using a device management apparatus that manages device maintenance and the like via a network.

Japanese Patent Application Laid-Open No. 2015-18338 proposes a technique relating to a management apparatus that receives security information from a device connected to a network, decides whether or not there is a change in the security information, notifies a user of the change in the security information when there is the change, and returns the security setting to the security setting before the change, thereby monitoring the security setting of the device.

In this case, since a proper security setting is different depending on the use environment of the device, it is necessary to change the security setting when the use environment of the device changes.

However, the technique disclosed in Japanese Patent Application Laid-Open No. 2015-18338 does not take into account the change in the use environment of the device. Therefore, even when the security setting is properly changed due to the change in the use environment of the device, the security setting is returned to the state before the change. Therefore, there is a possibility that security may be reduced.

SUMMARY

According to an aspect of the present disclosure, a management apparatus that manages an image processing apparatus and includes at least one memory and at least one processor which function as a determining unit configured to determine a security policy, an input unit configured to input designation of the image processing apparatus of which the security policy is to be monitored, a delivery unit configured to deliver the security policy to the image processing apparatus to be monitored, an acquisition unit configured to acquire a type corresponding to an installation environment or how to use selected in the image processing apparatus, from the image processing apparatus to which the security policy is delivered, a holding unit configured to hold the acquired type, and an execution unit configured to execute a monitoring process of the security policy, for the image processing apparatus to be monitored, wherein, in the monitoring process, the type being selected and the security policy applied to the image processing apparatus are acquired from the image processing apparatus to be monitored, and in a first case where the acquired security policy does not match the determined security policy and the acquired type being selected in the image processing apparatus matches the held type, the determined security policy is delivered by the delivery unit to the image processing apparatus to be monitored.

Further features of the present disclosure will become apparent from the following description of exemplary embodiments with reference to the attached drawings.

BRIEF DESCRIPTION OF THE DRAWINGS

FIG. 1 is a diagram showing a configuration of an overall system according to an embodiment of the present disclosure.

FIG. 2 is a block diagram schematically showing a hardware configuration of a device to be monitored.

FIG. 4 is a block diagram showing a functional configuration of the overall system according to the embodiment.

FIG. 5 is a diagram showing a creation/edit screen of a security setting serving as monitoring source data of the management apparatus.

FIG. 6 is a diagram showing a security monitoring setting screen according to a first embodiment.

FIG. 9 is a diagram showing a security monitoring setting screen according to a second embodiment.

DESCRIPTION OF THE EMBODIMENTS

Figure 3:
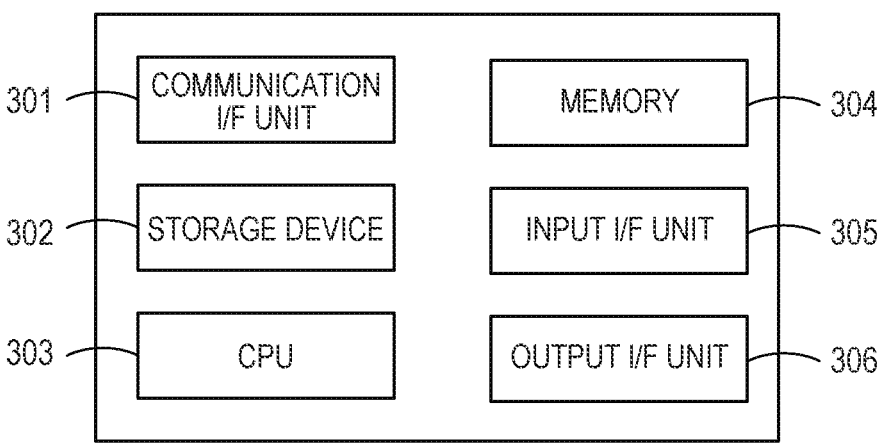
FIG. 3 is a block diagram schematically showing a hardware configuration of a management apparatus.

Hereinafter, embodiments of the present disclosure will now be described with reference to the accompanying drawings. The following embodiments do not limit the disclosure pertaining to the claims, and all combinations of features described in the embodiments are not necessarily essential to means for solving the disclosure.

An embodiment of the present disclosure will now be described with reference to the accompanying drawings.

First Embodiment

<System Configuration>

Figure 1:
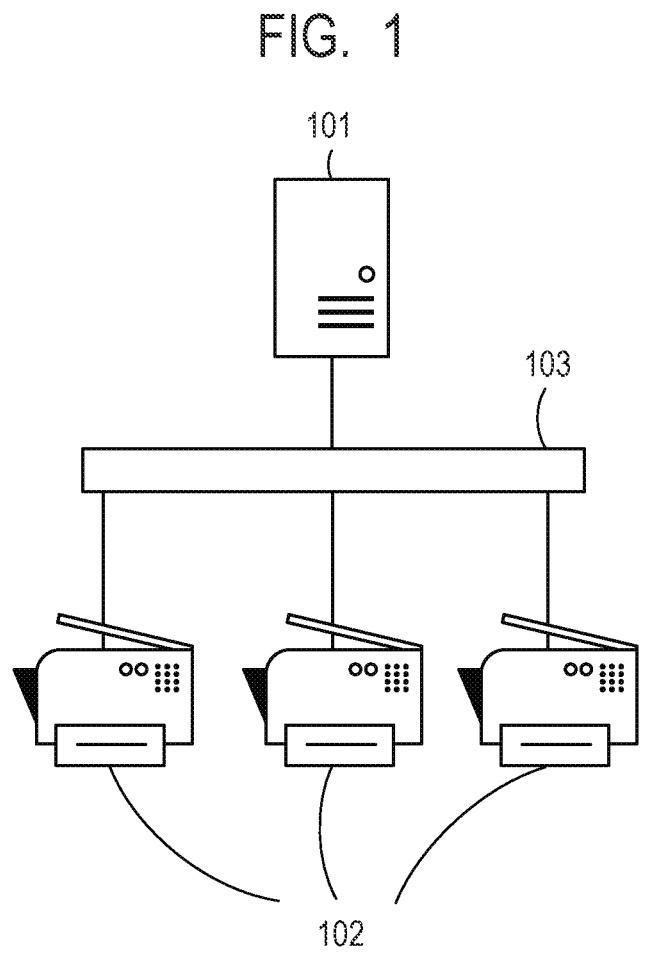

FIG. 1 is a diagram showing a configuration of an overall system according to the embodiment of the present disclosure. The system of the present embodiment is a device management system and includes a management apparatus and one or more devices.

In FIG. 1, a management apparatus 101 manages a plurality of devices 102 via a communication line 103 such as a network. The management apparatus 101 acquires information from the device 102 and writes information to the device 102, thereby performing various types of management including management of settings of security-related functions.

The device 102 is a printing apparatus (an image processing apparatus) such as an LBP (Laser Beam Printer) or an MFP (Multi-Function Peripheral).

<Hardware Configuration of Device>

FIG. 2 is a block diagram schematically showing an example of a hardware configuration of the device 102.

As shown in FIG. 2, the device 102 of the present embodiment includes an overall control unit 211. The overall control unit 211 controls interfaces with a reader unit 212, a printer unit 213, an operation unit 214, a switch unit 215 and a network 217 (such as the communication line 103) which are connected to the device 102, and controls overall operations of the device 102.

In the overall control unit 211, a CPU 201 functions as a controller for controlling the overall system. The CPU 201 reads out and executes a control program from a ROM 202 or an HDD 205 to realize various functions. When the CPU 201 reads the control program or data from the HDD 205, the reading is controlled by a disk controller (HDC) 204.

The CPU 201 controls a reader I/F 207, a printer I/F 208, an operation unit I/F 209, a switch I/F 210 and a network (NW) I/F 216, which are connected via a system bus 206. A RAM 203 is used as a working area when the CPU 201 executes the control program. Note that another storage device such as an SSD (Solid State Drive) or an eMMC (embedded Multi-Media Card) may be provided instead of or in combination with the HDD (Hard Disk Drive).

The reader I/F 207 is connected to the reader unit 212, and controls the operation of the reader unit 212.

The printer I/F 208 is connected to the printer unit 213, and controls the operation of the printer unit 213.

The operation unit I/F 209 is connected to the operation unit 214, and performs a process for transmitting user operation information input from the operation unit 214 to the CPU 201, a process for controlling display of the operation unit 214 based on information received from the CPU 201, and the like.

The switch I/F 210 is connected to the switch unit 215, and transmits ON/OFF states of the switch unit 215 or the like to the CPU 201.

The reader unit 212 reads an image of a document under the control of the reader I/F 207. In response to an instruction from a user, the reader unit 212 performs a process for transmitting image data corresponding to the image of the document to the printer unit 213 and a process for storing the image data in the HDD 205. Further, the image data output by the reader unit 212 can be transmitted to an external computer or the like via the network 217.

Under the control of the printer I/F 208, the printer unit 213 prints out the document read by the reader unit 212 and the image data read from the HDD 205. Further, the printer unit 213 receives a print job from an external computer or the like via the network 217, and executes the received print job.

The operation unit 214, which includes, for example, a keyboard, a pointing device, a display device and the like, receives an operation input by the user, and displays information to the user. The operation unit 214 may be a display device with a touch panel.

The switch unit 215 includes switches for the user to operate the device 102, and controls the ON/OFF states of the switches.

The network I/F 216 is connected to the network 217. The overall control unit 211 performs mutual communication with other information devices and the like on the network 217, via the network I/F 216.

<Hardware Configuration of Management Apparatus>

FIG. 3 is a block diagram schematically showing an example of a hardware configuration of the management apparatus 101.

In FIG. 3, a communication I/F unit 301 is a network interface for communicating with an external system, an external apparatus, or the like.

A storage device 302 stores an OS (Operating System), various data, and the like. The various data include, for example, data collected from an internal program or operation information, and data collected from the external system, the external apparatus or the like. The storage device 302 may be an HDD, an SSD, an eMMC, or a combination thereof.

A CPU 303 loads a program from the storage device 302 to a memory 304 and executes the loaded program. The memory 304 is used as a working memory of the CPU 303.

An input I/F unit 305 is connected to the keyboard, the pointing device and the like, and receives the operation input by the user.

An output I/F unit 306 is connected to an output device such as the display device or the like, and outputs a program execution result and the like.

The management apparatus 101 may be implemented by one computer or a plurality of computers. For example, the management apparatus 101 may be implemented by using a cloud computing technique.

<Functional Configuration of Overall System>

FIG. 4 is a block diagram showing an example of a functional configuration of the overall system according to the present embodiment.

The functional configuration of the management apparatus 101 shown in FIG. 4 is realized by the CPU 303 of the management apparatus 101 loading a program stored in the storage device 302 into the memory 304 and executing the loaded program. Besides, the functional configuration of the device 102 is realized by the CPU 201 of the device 102 loading a program stored in the ROM 202 or the HDD 205 into the RAM 203 and executing the loaded program.

An acquisition unit 401 of the management apparatus 101 acquires data related to a security setting (security policy), a use environment (a type corresponding to an installation environment or how to use) and the like from a device setting control unit 405 of the device 102.

A data management unit 402 performs a process for storing the data acquired by the acquisition unit 401, and a process for managing device information of the device 102 to be managed.

A screen control unit 403 generates a screen based on the information managed by the data management unit 402, displays the screen on an output device via the output I/F unit 306, and stores input information from an input device in the data management unit 402 via the input I/F unit 305.

Further, the screen control unit 403 displays a screen similar to that described above on a web browser or the like operating on not-shown another information device (e.g., a personal computer (PC), a smartphone or the like) connected to the network via the communication I/F unit 301, and stores input information from the web browser or the like in the data management unit 402.

A device management unit 404 performs a security setting monitoring process for the device setting control unit 405 of the device 102 based on a security monitoring setting managed by the data management unit 402. Besides, the device management unit 404 instructs the device setting control unit 405 of the device 102 to change the security setting based on the information managed by the data management unit 402.

The device setting control unit 405 of the device 102 collectively sets security functions of the device 102 in response to an instruction from the user detected via the operation unit 214 or a security setting change instruction from the device management unit 404 of the management apparatus 101.

The device setting control unit 405 can hold a management password according to an instruction from the user detected via the operation unit 214.

The device setting control unit 405 compares the device setting management password included in the above-described security setting change instruction with a management password held by the device setting control unit 405 itself, and changes the setting of the security function only when the device setting management password matches the management password held by the device setting control unit 405 itself.

Further, the device setting control unit 405 transmits the security setting to the acquisition unit 401 in response to an instruction from the acquisition unit 401 of the management apparatus 101. Here, the security setting is, for example, a setting of a security measure such as encryption of a communication path, invalidation of a legacy protocol, and prohibition of use of a USB external storage device.

The device setting control unit 405 transmits use environment information to the acquisition unit 401 in response to an instruction from the acquisition unit 401 of the management apparatus 101.

A use environment management unit 406 manages combinations of setting items and setting values of the security functions suitable for the use environment of the device 102, in association with the use environment information divided into a plurality of pieces. In response to a setting instruction of the use environment from the user detected via the operation unit 214, the use environment management unit 406 instructs the device setting control unit 405 to collectively set the security functions, and transmits the set use environment information to the device setting control unit 405.

By using the combinations of the setting items and the setting values of the security functions received based on the collective setting instruction of the security functions from the use environment management unit 406, the device setting control unit 405 performs the collective settings of the security functions, and stores the use environment information received from the use environment management unit 406.

The setting instruction of the use environment to the use environment management unit 406 may be by communication from another information device on the network 217 via the network I/F 216 or a self-diagnosis of the use environment management unit 406 based on internal information of the device 102 itself. Here, the internal information of the device 102 itself is, for example, hardware configuration setting information such as network information of the network I/F 216, or software configuration setting information such as a security setting value.

\<Security Template Selection Screen of Device 102\>

A security template selection screen 800 displayed on the operation unit 214 of the device 102 will be described with reference to FIG. 8.

Figure 8:
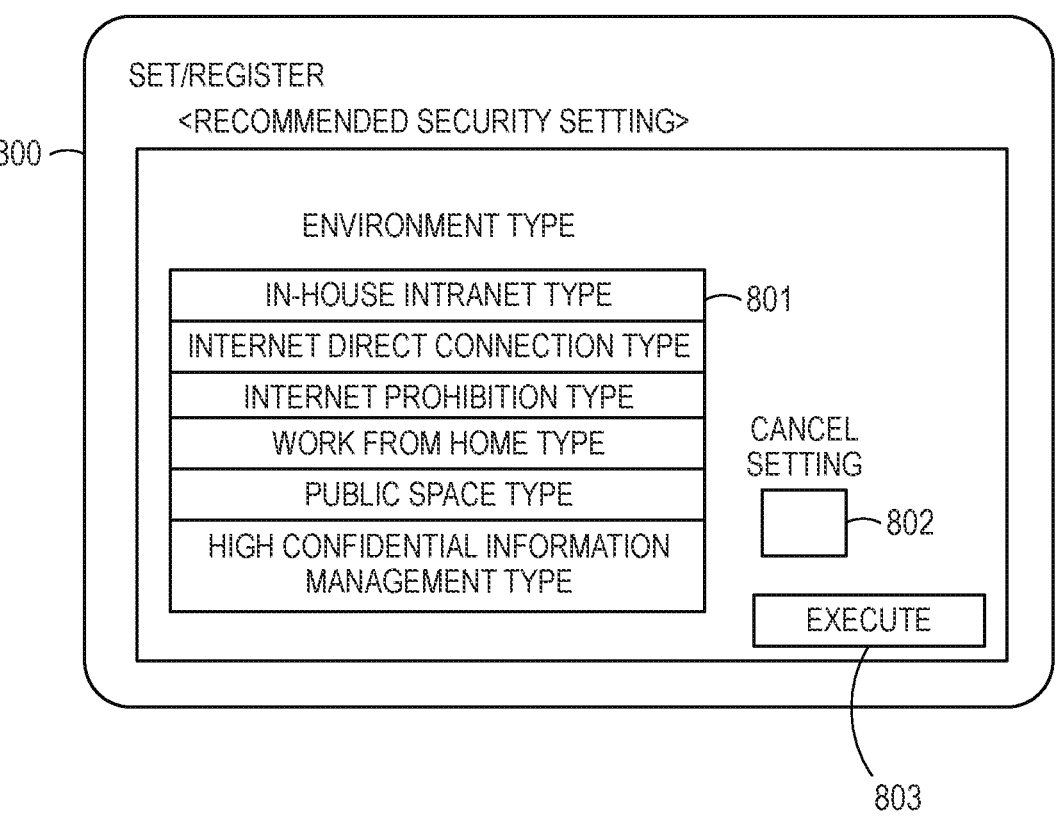
FIG. 8 is a diagram showing a security template selection screen.

FIG. 8 is a diagram showing an example of the security template selection screen 800 displayed on the operation unit 214 of the device 102.

In the present embodiment, the security template selection screen 800 displayed on the operation unit 214 of the device 102 will be described as an example of the setting instruction of the use environment to the use environment management unit 406, but the present disclosure is not limited thereto.

For example, it is also possible, by using a web UI (remote UI) or the like via the network I/F 216, to provide a web page similar to the security template selection screen 800 to a web browser or the like of an external information processing apparatus, and perform a setting operation using the provided web page.

The security template selection screen 800 includes a security template display area 801, a setting cancel button 802, and an execution button 803.

A list of security templates stored in the HDD 205 is displayed in the security template display area 801. Each security template is added with a name of a type of use environment (i.e., the type corresponding to the installation environment or how to use) indicating the security template suitable for a device installed in which environment.

For example, it is assumed that a device administrator of the device 102 selects an "in-house intranet environment" from among the security templates via the security template selection screen 800. When this selection is applied, setting values of setting items such as an "encryption of SMB", an "SMB signature", an "SMB protocol Ver. 3.1", a "transmission filter", a "reception filter", a "publication of advanced box", a "use of memory media" and the like of the device 102 are changed.

The user selects the security template of the device 102 from the security template display area 801 (i.e., selects the use environment), and presses the execution button 803.

When the use environment management unit 406 of the device 102 detects such a user operation via the input I/F unit 305, the use environment management unit 406 instructs the device setting control unit 405 to collectively set the security functions according to the selection result by the user, and transmits information indicating the selection result.

The device setting control unit 405 collectively sets the security functions suitable for the use environment selected by the user, based on the information received from the use environment management unit 406. Besides, the device setting control unit 405 stores the information on the use environment selected by the user.

\<Security Monitoring Screen of Management Apparatus 101\>

The management apparatus 101 uses the security setting which is input via a screen shown in FIG. 5 generated by the screen control unit 403 and is managed by the data management unit 402 as monitoring source data, and compares the monitoring source data with the security setting of the device 102 acquired by the acquisition unit 401, thereby monitoring whether or not the security setting of the device 102 has been altered to a value different from the monitoring source data. When the monitoring result indicates that the security setting of the device 102 is different from the monitoring source data, the management apparatus 101 recovers the security setting of the device 102 to the value of the monitoring source data, and notifies (e.g., by mail notification) an IT administrator of such a fact.

FIG. 5 is a diagram showing an example of a creation/edit screen of the security setting serving as the monitoring source data of the management apparatus 101.

The creation/edit screen of the security setting includes a "security name" section and a "security setting" section.

The "security name" section has a text entry column for entering a name of the security setting (security policy) defined by the user. In the example of FIG. 5, a "direct connection/wireless LAN prohibition" has been input.

The "security setting" section is a setting area for designating a combination of the setting items and the setting values of the security functions, and is divided into a plurality of categories including an "interface" category and an "authentication" category in the example of FIG. 5.

Besides, in the example of FIG. 5, the "interface" category includes, for example, a "wireless policy" intermediate item, a "USB policy" intermediate item, and the like.

The "wireless policy" intermediate item includes setting items such as a check box (setting value "ON" in this example) of a "prohibit use of direct connection" and a check box (setting value "ON" in this example) of a "prohibit use of wireless LAN".

The "USB policy" intermediate item includes setting items such as a check box (setting value "OFF" in this example) of a "prohibit use as USB device" and a check box (setting value "ON" in this example) of a "prohibit use of USB external storage device".

Further, by selecting the check box of the category name, the setting items in the category can be collectively changed to ON or OFF.

In the example of FIG. 5, the "authentication" category includes intermediate items such as a "password setting policy" intermediate item.

For example, the "password setting policy" intermediate item includes a "set minimum number of characters in password" check box (setting value "ON" in this example) and a "minimum number of characters" setting item (setting value "8" in this example).

In the setting having the parent-child relationship, the element of the child can be input only when the check box of the parent is "ON".

Further, the creation/edit screen of the security setting includes an "apply" button, a "delete" button, and a "cancel" button.

The "apply" button is a button for confirming the security setting created/edited on this screen and storing the confirmed security setting in the data management unit 402.

The "delete" button is a button for deleting the existing security setting.

The "cancel" button is a button for stopping a security setting creation/edit process on this screen.

Besides, a "use environment" section including a selection list for selecting a use environment may be provided on the creation/edit screen of the security setting shown in FIG. 5. In this case, the combination of the setting items and the setting values selected in the "security setting" section may be associated with the use environment selected in the "use environment" section and managed by the data management unit 402.

FIG. 6 is a diagram showing an example of a security monitoring setting screen of the management apparatus 101 according to the first embodiment.

The management apparatus 101 confirms and delivers the security policy based on a monitoring setting input on the security monitoring setting screen shown in FIG. 6.

On the security monitoring setting screen, a "task type" section text-displays a type of function (in this example, "security monitoring & delivery") to be set on the security monitoring setting screen.

A "valid/invalid" section is a selection list for selecting whether to validate or invalidate the "security monitoring & delivery" function.

An "execution schedule" section includes an "execution schedule" and an "execution cycle" (not shown), and is a selection list and an edit box for setting schedule information for executing a security monitoring process.

Here, the "execution schedule" is used to select an execution schedule such as an "execute periodically" or an "execute immediately".

Besides, the "execution cycle" is used to set how the execution schedule is periodically executed when the execution schedule is the "execute periodically". For example, the following execution cycles are set.

Monthly: designation of day and time
Weekly: designation of day of week and time
Daily: designation of time The settings of the "execution schedule" and the "execution cycle" are not limited to the above-described methods. For example, an irregular delivery schedule or a cycle such as 09:00 to 17:00 from Monday to Friday of a certain week, and all day Saturday and Sunday may be set.

A "process contents" section is a selection list for selecting the process content to be performed when it is detected that the security setting of the device 102 has been altered to a value different from that of the monitoring source data.

For example, when a "deliver security setting and overwrite device setting" is selected, the management apparatus 101 instructs the device setting control unit 405 of the device 102 to change the security setting into the monitoring source data regardless of a change in the use environment of the device 102.

Besides, when a "deliver security setting and overwrite device setting only when device use environment is not changed" is selected, the management apparatus 101 stores initial use environment information of the device 102 of the security monitoring process in the data management unit 402. The management apparatus 101 compares a current user environment with the initial use environment, does not deliver the security setting when the current use environment has been changed, and instructs the device setting control unit 405 of the device 102 to change the security setting into the monitoring source data only when the use environment is not changed.

When a "detect change only" is selected, the management apparatus 101 does not deliver the security setting.

A "password" section has a text input field for inputting the management password included in the security setting instruction to the device setting control unit 405 of the device 102. The "password" section is valid when the "deliver security setting and overwrite device setting" or the "deliver security setting and overwrite device setting only when device use environment is not changed" is selected in the "process contents" section.

A "mail notification setting" section has a check box for setting whether to send a warning mail to the user when it is detected that the security setting of the device 102 has been altered to a value different from that of the monitoring source data.

An "address" section is a text input column for inputting a destination address of the warning mail to be sent when the check box of the "mail notification setting" section is ON. When there are a plurality of notification destinations, mail addresses may be designated using delimiter symbols such as semicolons and commas.

A "security setting information name" section is a selection list for selecting the security setting (security policy) managed by the data management unit 402. In the security monitoring of the management apparatus 101, the security setting selected in the "security setting information name" section is used as the monitoring source data (determination of the security policy).

A "device selection" section is a selection list for selecting a device to be monitored by the security monitoring of the management apparatus 101.

An "apply" button is a button for confirming the security monitoring setting. By pressing the "apply" button, the security monitoring setting on the security monitoring setting screen can be confirmed and stored in the data management unit 402.

A "cancel" button is a button for stopping an editing process of the security monitoring setting. By pressing the "cancel" button, the editing process of the security monitoring setting can be stopped.

Next, a process for each device from when the user validates the security monitoring setting in the screen control unit 403 and the time reaches the date and time set as the execution schedule, to when the monitoring process of the security function for the device 102 to be monitored is completed will be described with reference to FIG. 7.

Figure 7:
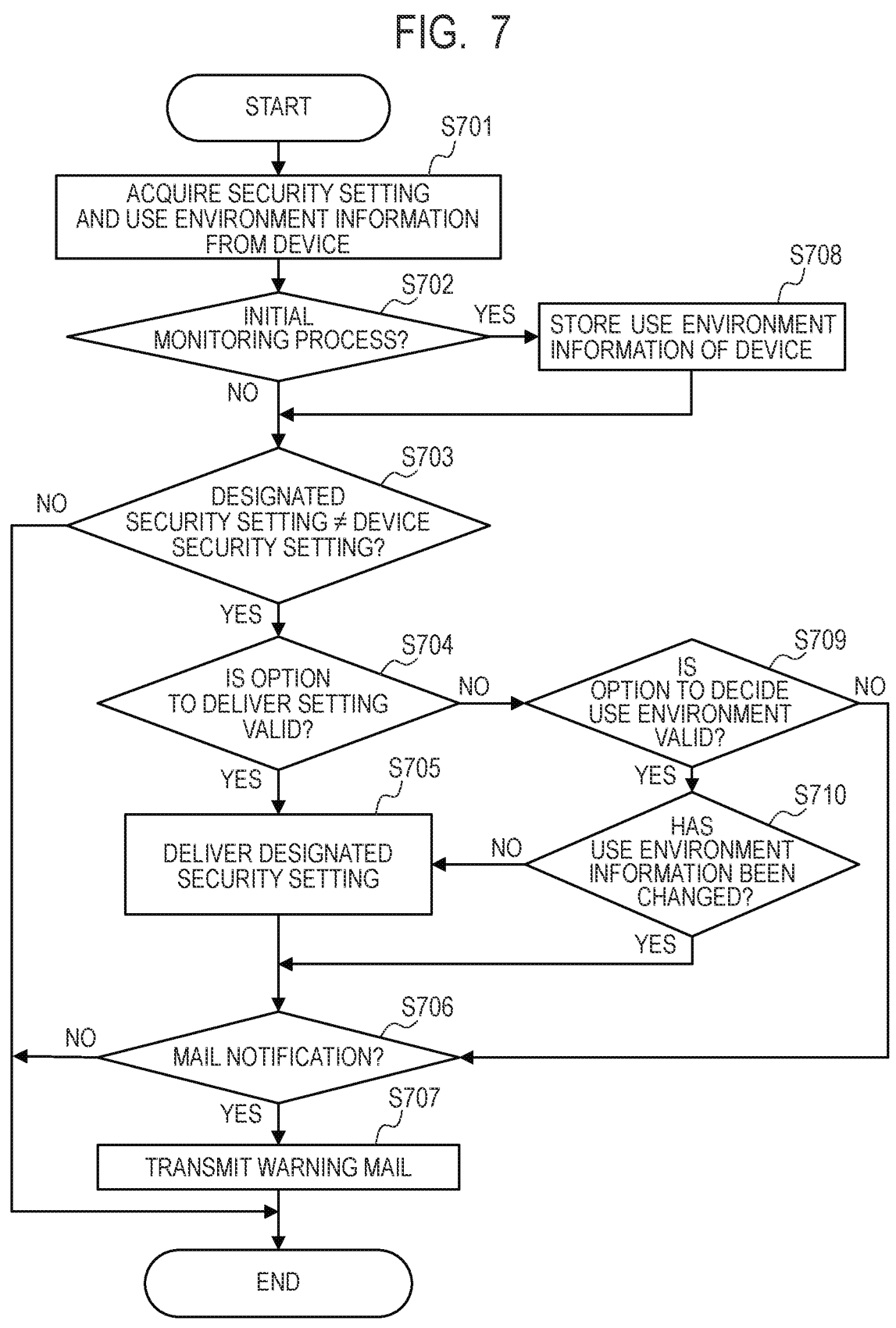
FIG. 7 is a flowchart showing a security setting monitoring process according to the first embodiment.

FIG. 7 is a flowchart showing an example of the security setting monitoring process to be executed by the management apparatus 101 in the first embodiment. The CPU 303 of the management apparatus 101 loads a program stored in the storage device 302 into the memory 304 and executes the program, thereby realizing the process of this flowchart.

When the device management unit 404 acquires the execution schedule included in the security monitoring setting managed by the data management unit 402 and detects that the current time has reached the time designated in the execution schedule, the process of the flowchart shown in FIG. 7 is started.

In S701, the device management unit 404 instructs the acquisition unit 401 to acquire the security setting and the use environment information from the device setting control unit 405 of the device 102, and advances the process to S702.

In S702, the device management unit 404 decides whether the monitoring process is an initial monitoring process after storing the security monitoring setting in the data management unit 402. If the monitoring process is the initial monitoring process (YES in S702), the device management unit 404 advances the process to S708.

In S708, the device management unit 404 stores the use environment information acquired from the device setting control unit 405 in S701 in the data management unit 402, and advances the process to S703.

On the other hand, if the monitoring process is not the initial monitoring process (NO in S702), the device management unit 404 advances the process to S703.

In S703, the device management unit 404 acquires the security monitoring setting from the data management unit 402, and compares the security setting designated in the security monitoring setting with the security setting acquired from the device 102 in S701. If they match (NO in S703), the device management unit 404 ends the process of this flowchart.

On the other hand, when they do not match (YES in S703), the device management unit 404 advances the process to S704.

In S704, the device management unit 404 decides whether or not the process content included in the security monitoring setting is the "deliver security setting and overwrite device setting". Here, when the process content is the "deliver security setting and overwrite device setting" (YES in S704), the device management unit 404 advances the process to S705.

In S705, the device management unit 404 delivers the security setting designated in the security monitoring setting to the device setting control unit 405 of the device 102, and advances the process to S706. Here, the device setting control unit 405 of the device 102 verifies the management password included in the received security setting, reflects the security setting when the verified management password matches the management password of the device 102, and returns information indicating that the change of the security setting has been successful to the management apparatus 101. On the other hand, when the management passwords do not match, the device setting control unit 405 returns information indicating that the change of the security setting has failed to the management apparatus 101.

In S706, the device management unit 404 decides whether or not the mail notification setting included in the security monitoring setting is "ON". Here, when the mail notification setting is "OFF" (NO in S706), the device management unit 404 ends the process of this flowchart.

On the other hand, when the mail notification setting is "ON" (YES in S706), the device management unit 404 advances the process to S707.

In S707, the device management unit 404 transmits, for example, a warning mail indicating that the security setting of the device 102 has been changed and/or indicating a delivery result (success/failure or the like) of the security setting of the device 102 to the user, and ends the process. With the warning mail, it may be notified that a change in the use environment has been detected in S710, which will be described later. The content to be notified may be a format in which a detailed monitoring result is filed and attached to a mail, or a link destination such as a URL indicating the detailed monitoring result may be presented, in addition to describing the content in the mail text. Further, not only the warning by the mail notification, but also a log or a report including information such as monitored date and time and the like may be displayed by the screen control unit 403.

When the process content included in the security monitoring setting is not the "deliver security setting and overwrite device setting" (NO in S704), the device management unit 404 advances the process to S709.

In S709, the device management unit 404 decides whether or not the process content included in the security monitoring setting is the "deliver security setting and overwrite device setting only when device use environment is not changed". Here, when the process content is not the "deliver security setting and overwrite device setting only when device use environment is not changed" (NO in S709), the device management unit 404 advances the process to S706.

On the other hand, when the process content included in the security monitoring setting is the "deliver security setting and overwrite device setting only when device use environment is not changed" (YES in S709), the device management unit 404 advances the process to S710.

In S710, the device management unit 404 decides whether or not the use environment information of the device 102 has been changed. Whether or not the use environment information of the device 102 has been changed is decided by comparing the initial use environment information of the monitoring process stored in the data management unit 402 in S708 with the use environment information acquired from the device 102 in S701. When the use environment information of the device 102 is not set, or when the use environment information cannot be acquired due to the fact that the device 102 does not correspond to the use environment information, the device management unit 404 may decide that the use environment does not change, and advance the process to S705.

When the use environment information of the device 102 is not changed (NO in S710), the device management unit 404 advances the process to S705 to deliver the security setting.

On the other hand, when the use environment information of the device 102 has been changed (YES in S710), the device management unit 404 advances the process to S706, and mail-notifies that the change in the use environment has been detected.

As described above, in the first embodiment, the management apparatus 101 can manage the plurality of devices including the device corresponding to the setting management function that enables to operate the plurality of setting values classified into a predetermined security included in the setting information of the device 102.

The management apparatus 101 acquires the setting information and the use environment information from the plurality of devices respectively. Further, the management apparatus 101 manages the plurality of setting values classified into the predetermined security in association with the devices. Further, when the plurality of setting values classified into the predetermined security included in the setting information received from the device 102 are different from the setting values associated with the devices managed by the management apparatus 101, the management apparatus 101 decides whether or not there is the change in the use environment information of the device that is the source of the setting value.

When there is no change in the use environment information of the device that is the source of the setting value, the management apparatus 101 sets (delivers) the setting value managed in association with the device to the device, and warns that the setting value has been changed. On the other hand, when there is the change in the use environment information of the device that is the source of the setting value, the management apparatus 101 warns that there is the change in the use environment information without setting (delivering) the setting value to the device.

By such a configuration, when the security setting of the device is changed in accordance with the change of the use environment of the device, it is possible to notify the administrator that the security setting has been changed by the change of the use environment without returning the security setting to the security setting before the change of the use environment.

In the present embodiment, the configuration has been described in which the change in the use environment of the device is detected based on the use environment information of the device 102 at the start of security monitoring. However, it is also possible to employ a configuration in which a combination of the security setting items and the setting values is managed in association with the use environment on the creation/edit screen of the security setting of the management apparatus 101, and the security setting selected in the "security setting information name" section on the security monitoring setting screen and the use environment information associated with the security setting are used as the monitoring source data, thereby detecting the change in the use environment by the comparison with the use environment information of the device 102.

Second Embodiment

In the first embodiment, the specific security setting is previously associated with the device 102 to be monitored as the monitoring source data on the security monitoring setting screen, and when the security setting of the device 102 is changed from the monitoring source data, writing back to the specific security setting and the mail notification are performed according to presence or absence of the change in the use environment. Thus, when the use environment of the device 102 to be monitored is changed, the security setting that the use environment management unit 406 of the device 102 instructs the device setting control unit 405 to perform the collective setting is prioritized over the security setting that is managed by the data management unit 402 of the management apparatus 101.

In the case of the first embodiment, when the IT administrator wishes to perform more detailed setting of the security setting of the device 102 in the changed use environment, it is necessary to update a proper security monitoring setting for the device from the screen after the IT administrator receives the warning mail.

In the second embodiment, security settings for each use environment are respectively associated and selected on the security monitoring setting screen. Hereby, in the security monitoring process, when it is decided that the use environment of the device has been changed, instead of not delivering the security setting, but it is controlled to deliver the security setting associated with the changed use environment.

Hereinafter, the second embodiment will be described in detail with reference to FIGS. 9 and 10.

The management apparatus 101 of the second embodiment confirms and delivers the security policies based on the monitoring settings input on the security monitoring setting screen shown in FIG. 9.

FIG. 9 is a diagram showing an example of the security monitoring setting screen of the management apparatus 101 according to the second embodiment.

Since the "task type" section, the "valid/invalid" section, the "execution schedule" section, the "process contents" section, the "password" section, the "mail notification setting" section, the "address" section, and the "device selection" section are the same as those of the security monitoring setting screen of the first embodiment shown in FIG. 6, the drawings and descriptions thereof are partially omitted.

Only a "security setting information name" section 901 differs from that of the security monitoring setting screen of the first embodiment shown in FIG. 6.

In the "security setting information name" section 901 of the second embodiment, designation is possible for each use environment (environment type), and there is a check box for setting whether or not to designate the security setting. When the check box is "ON", the designation of the security setting in the relevant use environment is valid, and when the check box is "OFF", the designation of the security setting in that use environment is invalid.

In the example of FIG. 9, an "in-house intranet" is selected as the security setting of an environment type "in-house intranet type", and is used as the monitoring source data of the environment type "in-house intranet type".

Further, a "direct connection/wireless LAN prohibition" is selected as the security setting of an environment type "Internet direct connection type", and is used as the monitoring source data of the environment type "Internet direct connection type".

In an environment type "highly confidential information management type", the check box is set to "OFF" and a selection of security setting is invalid.

Hereinafter, a security setting monitoring process according to the second embodiment will be described.

Figure 10:
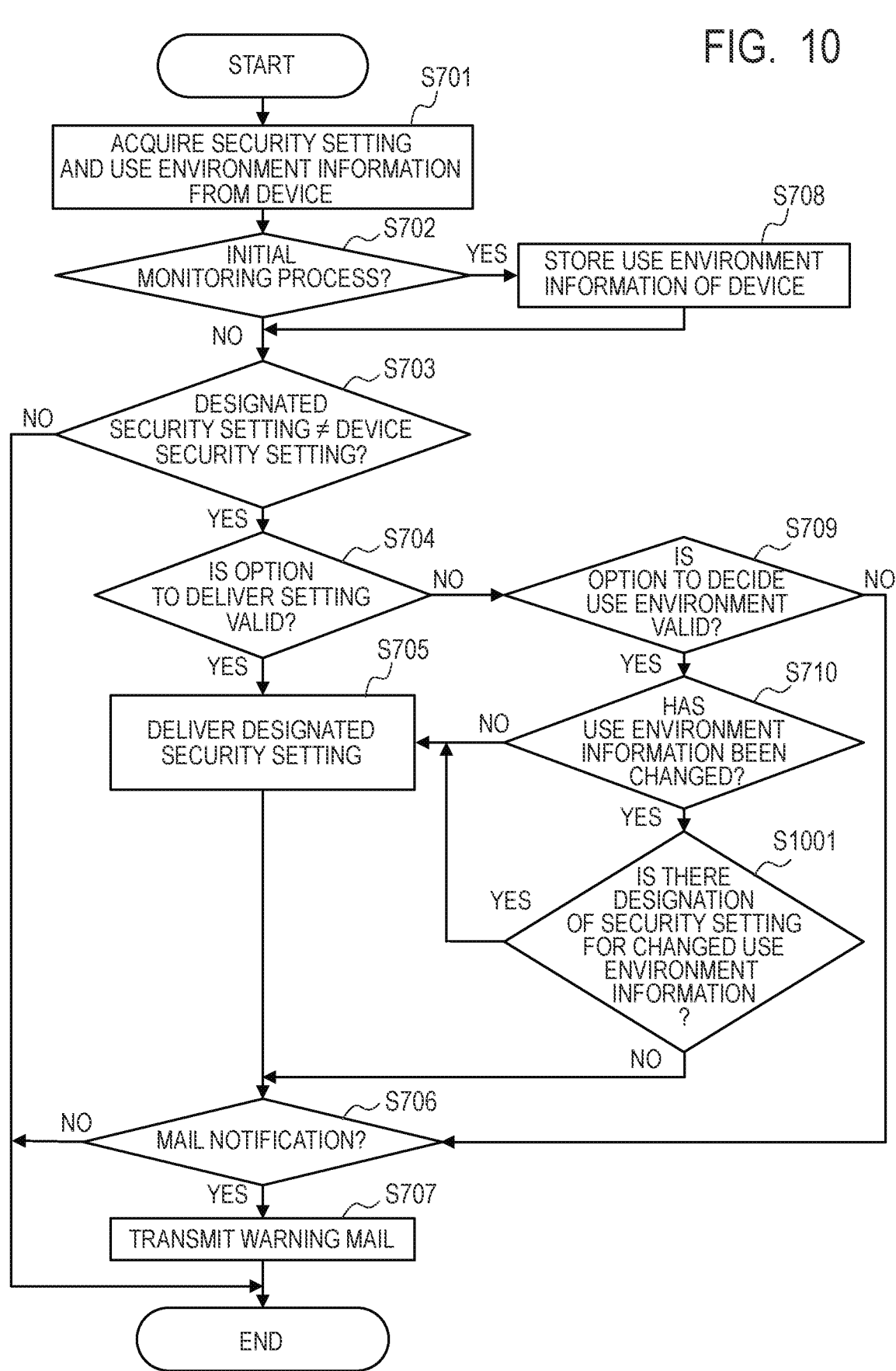
FIG. 10 is a flowchart showing a security setting monitoring process according to the second embodiment.

FIG. 10 is a flowchart showing an example of the security setting monitoring process to be executed by the management apparatus 101 in the second embodiment. The CPU 303 of the management apparatus 101 loads a program stored in the storage device 302 into the memory 304 and executes the program, thereby realizing the process of this flowchart. The steps identical to those in FIG. 7 are denoted by the same step numbers respectively. Only S1001 is different from FIG. 7.

In the second embodiment, when the device management unit 404 decides in S710 that the use environment information of the device 102 has been changed (YES in S710), the device management unit 404 advances the process to S1001.

In S1001, the device management unit 404 decides whether or not there is designation of the security setting for the changed use environment information. Here, when there is the designation of the security setting for the changed use environment information (YES in S1001), the device management unit 404 advances the process to S705, and delivers the security setting designated for the changed use environment information in the security monitoring setting to the device setting control unit 405 of the device 102.

On the other hand, when there is no designation of the security setting for the changed use environment information (NO in S1001), the device management unit 404 advances the process to S706, and mail-notifies that the change in the use environment has been detected and that the security setting is not designated for the changed use environment information.

As described above, in the second embodiment, the management apparatus 101 manages the plurality of setting values classified into the predetermined security, and further manages the setting values in association with each predetermined use environment. Further, when the use environment information has been changed with respect to the device being the transmission source of the setting value, the management apparatus 101 sets (delivers) the setting value managed in association with the changed use environment information to the device.

By the configuration like this, in the device for which the use environment has been changed, it is possible to properly monitor the security setting without returning the setting to the setting before the change of the use environment in the monitoring of the security setting.

Third Embodiment

In the third embodiment, for example, when the user instructs to change the use environment (when changing the use environment) via the operation unit 214, the user is enabled to input a change reason (it may be a format for selecting the reason or a format for character-inputting a comment) as necessary.

When the change reason is input, the use environment management unit 406 also transmits the change reason when transmitting the setting-changed use environment information to the device setting control unit 405.

After performing the collective setting of the security function, the device setting control unit 405 stores the use environment information received from the use environment management unit 406 and transmits the use environment information (and the change reason) to the management apparatus 101.

When the management apparatus 101 receives the changed use environment (and the change reason) from the device 102, the device management unit 404 notifies the administrator of the management apparatus 101 of the information such as the device name, the use environment before and after the change, the change reason and the like via the screen of the screen control unit 403, and performs warning. On this screen (warning screen), the warning is issued to confirm the designation of the security setting of the security monitoring setting associated with the device 102 (prompting confirmation).

The administrator can open the security monitoring setting screen from this warning screen, and can change a selection of the device or a selection of the security setting according to the changed use environment, if necessary.

When the selection of the device or the selection of the security setting is changed, the device management unit 404 updates (or may delete) the use environment information associated with the device 102 and stored in the data management unit 402 to the changed use environment information. As a result, in the security setting monitoring process of FIG. 6, the decision in S710 is "NO", and security setting associated with the device 102 designated in accordance with the changed use environment is delivered when the confirmation operation is performed (S705).

When the administrator does not change the selection of the device or the selection of the security setting, the decision in S710 is "YES", and the delivery of the security setting to the device 102 is skipped.

As described above, according to the third embodiment, in the device for which the use environment has been changed, it is possible to deliver the security setting changed and designated according to the changed use environment without returning the setting to the setting before the change of the use environment in the monitoring of the security setting.

As described above, according to each embodiment, it is possible to properly monitor the security setting in consideration of the change of the type corresponding to the installation environment or how to use selected in the device. That is, in the device for which the use environment has been changed, it is possible to properly monitor the security setting without returning the setting to the setting before the change of the use environment in the monitoring of the security setting.

It is needless to say that the configurations and contents of the above-described various data are not limited thereto, and various configurations and contents are applied depending on applications and purposes.

Although the embodiment of the present disclosure has been described above, the present disclosure can be implemented as, for example, a system, an apparatus, a method, a program, a storage medium or the like. Specifically, the present disclosure may be applied to a system including a plurality of devices, or may be applied to an apparatus including a single device.

The present disclosure includes all configurations obtained by combining the above-described embodiments.

According to the present disclosure, it is possible to properly monitor the security setting in consideration of the change of the type corresponding to the installation environment or how to use selected in the device.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-022714, filed Feb. 16, 2023, which is hereby incorporated by reference herein in its entirety.

What is claimed is:

1. A management apparatus managing an image processing apparatus, comprising:
at least one memory storing instructions and at least one processor which, when executing the instructions, causes the management apparatus to:
receive designation of the image processing apparatus of which the first security policy is to be monitored;
deliver the first security policy to the image processing apparatus to be monitored;
acquire a type corresponding to an installation environment or how to use selected in the image processing apparatus, from the image processing apparatus to which the first security policy is delivered;
hold the acquired type acquired from the image processing apparatus; and
execute, after the type acquired from the image processing apparatus is held and according to a designated execution schedule, a monitoring process of the security policy, for the image processing apparatus to be monitored,
wherein, in the monitoring process,
a type currently being selected and a second security policy applied to the image processing apparatus are acquired from the image processing apparatus to be monitored,
in a case where the first security policy does not match the second security policy and the acquired type matches the held type, the first security policy is delivered to the image processing apparatus to be monitored, and
in a case where the first security policy does not match the second security policy and the acquired type does not match the held type, it is warned that the type is changed in the image processing apparatus without a delivery of the first security policy.

2. The management apparatus according to claim 1, wherein, in the monitoring process, in a case where the security policy does not match the second security policy and the acquired type matches the held type, it is warned that the security policy is change in the image processing apparatus in addition to a delivery of the first security policy.

3. The management apparatus according to claim 1, wherein the at least one processor further causes the management apparatus to:
receive a notification indicating that the type has been changed, from the image processing apparatus to be monitored;
output, based on the notification, a message indicating that the type is changed in the image processing apparatus to be monitored, and
prompt a confirmation of the security policy.

4. A control method of a management apparatus managing an image processing apparatus, the control method comprising:
receiving designation of the image processing apparatus of which a first security policy is to be monitored;
delivering the first security policy to the image processing apparatus to be monitored;
acquiring a type corresponding to an installation environment or how to use selected in the image processing apparatus, from the image processing apparatus to which the first security policy is delivered;
holding the type acquired from the image processing apparatus; and
executing, after the type acquired from the image processing apparatus is held and according to a designated execution schedule, a monitoring process of the security policy, for the image processing apparatus to be monitored,
wherein, in the monitoring process,
a type currently being selected and a second security policy applied to the image processing apparatus are acquired from the image processing apparatus to be monitored,
in a case where the first security policy does not match the second security policy and the acquired type matches the held type, the first security policy is delivered to the image processing apparatus to be monitored, and
in a case where the first security policy does not match the second security policy and the acquired type does not match the held type, it is warned that the type is changed in the image processing apparatus without a delivery of the first security policy.

5. A non-transitory computer-readable storage medium storing a program for executing a control method of a management apparatus managing an image processing apparatus, the control method comprising:

receiving designation of the image processing apparatus of which a first security policy is to be monitored;

delivering the first security policy to the image processing apparatus to be monitored;

acquiring a type corresponding to an installation environment or how to use selected in the image processing apparatus, from the image processing apparatus to which the first security policy is delivered;

holding the type acquired from the image processing apparatus; and executing, after the type acquired from the image processing apparatus is held and according to a designated execution schedule, a monitoring process of the security policy, for the image processing apparatus to be monitored, wherein, in the monitoring process, a type currently being selected and a second security policy applied to the image processing apparatus are acquired from the image processing apparatus to be monitored, in a case where the first security policy does not match the second security policy and the acquired type matches the held type, the first security policy is delivered to the image processing apparatus to be monitored, and in a case where the first security policy does not match the second security policy and the acquired type does not match the held type, it is warned that the type is changed in the image processing apparatus without a delivery of the first security policy.

\* \* \* \* \*